UNITED STATES PATENT OFFICE.

JOHN T. JACKSON, OF DES MOINES, IOWA, ASSIGNOR OF ONE-HALF TO P. P. INGALLS, OF SAME PLACE.

ARTIFICIAL FUEL.

SPECIFICATION forming part of Letters Patent No. 256,572, dated April 18, 1882.

Application filed July 21, 1881. (No specimens.)

*To all whom it may concern:*

Be it known that I, JOHN T. JACKSON, of Des Moines, in the county of Polk and State of Iowa, have invented an Improved Artificial Fuel, of which the following is a specification.

The object of my invention is to produce an artificial fuel from fibrous combustible substances that cannot in their natural state be used advantageously in a furnace, grate, or stove as a substitute for peat, wood, or coal.

Heretofore peat, sawdust, coal-dust, and other compact substances have been saturated with inflammable coal-tar and pressed into blocks.

My invention consists in utilizing common soil as a base for uniting dry grass, weeds, straw, forest leaves, dry manure, and similar incompact and inexpensive combustible substances, and also to aid in promoting the combustion thereof and advantageously using the carbon contained in the said fibrous and incompact vegetable substances.

To make a given quantity of my artificial fuel I heat inflammable tar in a suitable tank and then fill and stir in the liquid such loose fibrous and incompact vegetable substances as above named, and that may be obtained at a nominal cost, and about an equal quantity of turf-mold, prairie-muck, or any kind of common soil that is practically free of sand, clay, and gravel, until the hot adhesive liquid matter is absorbed and a conglomerate plastic mass produced that can be readily pressed into blocks of various shapes and sizes by means of suitable molds and machinery, or into flat slabs that are adapted to be broken into lumps of irregular form and size when the slabs are dry and hard.

In the practical use of my artificial fuel thus produced the soil used as a base for uniting the fibrous incompact and incohesive substances forms a body and a cover and protection for the combustible ingredients, and aids in retaining fire and heat and promoting combustion upon the same principle that a lamp-wick facilitates the burning of oil advantageously to produce light and heat.

I claim as my invention—

An artificial solid fuel composed of adhesive and inflammable tar, common soil, and incompact and incohesive fibrous vegetable substances—such as dry grass, weeds, straw, forest-leaves, and manure—substantially as and for the purposes set forth.

JOHN T. JACKSON.

Witnesses:
FRED HAMPTON,
R. G. ORWIG.